US005133485A

United States Patent [19]

Ohno

[11] Patent Number: 5,133,485

[45] Date of Patent: Jul. 28, 1992

[54] LIQUID FOOD POT

[76] Inventor: Shigeo Ohno, 15-1, Nishimaruyamacho, Yahatahigashi-ku, Kitakyushu-shi, Fukuoka 805, Japan

[21] Appl. No.: 661,166

[22] Filed: Feb. 27, 1991

[51] Int. Cl.$^5$ .............................................. G01F 11/00

[52] U.S. Cl. ....................................... 222/386; 92/255

[58] Field of Search ..................... 222/386, 386.5, 390; 92/181 P, 217, 255

[56] References Cited

U.S. PATENT DOCUMENTS

| | | | |
|---|---|---|---|
| 775,697 | 11/1904 | Bogart | 222/390 X |
| 941,551 | 11/1909 | Barner | 222/390 X |
| 1,177,010 | 3/1916 | Brunskill | 92/255 |
| 1,261,912 | 4/1918 | Ellis | 222/386 |
| 2,660,342 | 11/1953 | Ruf | 222/323 X |
| 3,447,427 | 6/1969 | Mickle | 92/255 X |
| 4,721,232 | 1/1988 | Federighi | 222/196.5 |
| 4,951,848 | 8/1990 | Keller | 222/386 |

FOREIGN PATENT DOCUMENTS

| | | | |
|---|---|---|---|
| 0143290 | 8/1980 | Fed. Rep. of Germany | 92/255 |
| 3706333 | 9/1988 | Fed. Rep. of Germany | 222/386 |
| 51-129586 | 10/1976 | Japan . | |
| 62-26104 | 7/1987 | Japan . | |

OTHER PUBLICATIONS

Catalog, issued by Ohno Industry Co., Ltd., Nov. 1989.
Article of invention in *Asahi*, Japanese Newspaper, issued on Dec. 8, 1989.

*Primary Examiner*—Michael S. Huppert
*Assistant Examiner*—J. A. Kaufman
*Attorney, Agent, or Firm*—Armstrong & Kubovcik

[57] ABSTRACT

A food pot for dispensing liquid foods includes a main body portion having a bottom and an upstanding sidewall, and a spout mounting portion formed on a lower portion of the sidewall. A spout is mounted on the spout mounting portion and is resiliently deformable, having an open spout end opposite a connecting portion which is connected to the spout mounting portion. The open spout end is in communication with the interior of the main body portion. A piston is slidably received within the sidewall of the main body portion, and is substantially hollow and includes a lower piston body portion and a lid portion, the lower piston body portion having a lower piston face and an upstanding piston sidewall. The upstanding piston sidewall has adjacent an uppermost end thereof a detachable attaching arrangement for removably attaching the lid portion to the lower piston body portion. A handle extends from the piston lid, and a pot lid closes the pot main body portion so as to enclose the piston between the bottom pot wall and the pot lid, the pot lid having an opening therein slidably receiving the handle. The piston lid has an opening therethrough in communication with the interior of the piston, and the piston sidewall has a plurality of grooves which extend along the entire length of the piston lower portion sidewall. At least one groove extends completely across the lower piston face.

7 Claims, 3 Drawing Sheets

LIQUID FOOD POT

FIELD OF THE INVENTION

The present invention relates to a liquid food pot which is adapted to gradually push out a liquid food placed in the pot.

For the purpose of this specification, the term 'liquid food' means foods in the form of a liquid prepared by mixer so that the foods may be suitable to be eaten by patients being ill in bed, aged people in bed and the like. More specifically, the 'liquid food' includes minced meat juice, fruit juice, gruel, etc.

Hitherto, a pot equipped with a spout has been popular to be used by sick person or aged people being ill in bed. A problem, however, exists in that the conventional pot of this type is integrally made of glass or the like making it difficult to clean the inside thereof. Moreover, another problem exists in that there is a danger of biting the spout portion with teeth.

To overcome such drawbacks, a construction of spout of a liquid food pot has been proposed, in which the spout portion is provided on the lower side surface of main body of the pot, the spout being made of rubber of elasticity or the like, as is disclosed in Japanese Laid-Open Utility Model Publication (unexamined) No. 63-147436 issued on Sept. 28, 1988.

Gravity is utilized for moving a food placed in the main body of the pot to the spout in the proposed liquid food pot mentioned above, and it is certain that there is no problem as far as a liquid of sufficient fluidity such as water, milk, tea is drunk. In case of eating gruel or minced meat juice, however, it becomes difficult to move the contents from the main body to the spout portion, and it is often the case that the fluidity of liquid food becomes poor and sticks to inside the main body of the pot particularly when amount of the liquid food becomes small.

To overcome that problem, the inventor of this invention has proposed a liquid food pot wherein even an adhesive food can be pushed out. The mentioned liquid food pot 30, shown in FIG. 7, comprises a cylindrical pot main body 32 having a bottom and a spout mounting part 31 on a lower part of side face, a spout 33 made of flexible material and mounted on the mentioned spout mounting part 31, a synthetic resin piston 34 engagedly inserted in the mentioned pot main body 32 and, a synthetic resin pushing down member 38 which is connected to the mentioned piston 34, provided through the lid 35 of the mentioned pot main body 32, and has holes 36, 37 on the middle part into each of which at least one finger can be inserted.

Especially, the mentioned piston 34 was given a long cylindrical shape so that it might slide smooth in the pot main body 32, and, by the need of saving material and reducing the weight, it had a hollow structure. In addition, to manufacture the mentioned piston 34, a prefabricated cylindrical piston body 39 made of synthetic resin and a synthetic resin bottom plate 40 of the pushing down member 38 were bonded by ultrasonic bonding.

However, the liquid food pot 30 having such a construction has been including a problem that the piston 34 deforms and cannot go smoothly into the pot main body 32 caused by the air inside the piston body 39 which was inflated due to the disinfection by boiling or steam after the use of liquid food pot 30.

SUMMARY OF THE INVENTION

The present invention was made to solve the above-discussed problem and has an object of providing a liquid food pot which can be disinfected by boiling or steam and by which it is possible to cause a sick person or patient to eat easily even though the fluidity of food becomes poor.

To accomplish the foregoing object, the liquid food pot in accordance with the present invention comprises a cylindrical pot main body having a bottom and spout mounting part on a lower part of side face, a spout made of flexible material and mounted on the mentioned spout mounting part, a synthetic resin piston engagedly inserted in the mentioned pot main body, and a synthetic resin pushing down member which is connected to the mentioned piston, provided through the lid of the mentioned pot main body, and provided with holes on the middle part into each of which at least one finger can be inserted, wherein the mentioned piston comprises a piston body having a side wall which is provided with an air vent at its outer side and a bottom plate which is fixed to the bottom end of mentioned side wall, and a ceiling member which is provided with at least one air vent hole and is screwed to the top portion of the side wall of mentioned piston body and, further, the mentioned pushing down member is fixed to the mentioned ceiling member.

In the liquid food pot in accordance with the mentioned present invention, since a piston provided with the pushing down member projecting outwardly is disposed in the pot main body, the piston comes down by pushing the pushing down member.

Further, since the piston is provided with an air vent at its outer side, the air remained in the main body is forced out at first, then the liquid food therein is pushed by the piston to move toward the spout.

Since the mentioned spout is made of flexible material, on the other hand, the liquid food can be forced by grasping the spout with fingers from both sides while keeping an end portion of the spout in patient's or aged person's mouth, whereby the liquid food can be successfully delivered into the mouth.

And, to disinfect by boiling the mentioned liquid food pot after use, the air inside the piston can go out or come in freely because the ceiling member of the piston has at least one air vent hole. In addition, even if a liquid food comes into the piston through this air vent, the inside of the piston can be cleaned by disassembling the piston by loosening the screw of the piston body which is screwed to the ceiling member.

DESCRIPTION OF THE PREFERRED EMBODIMENT

Figure 1:
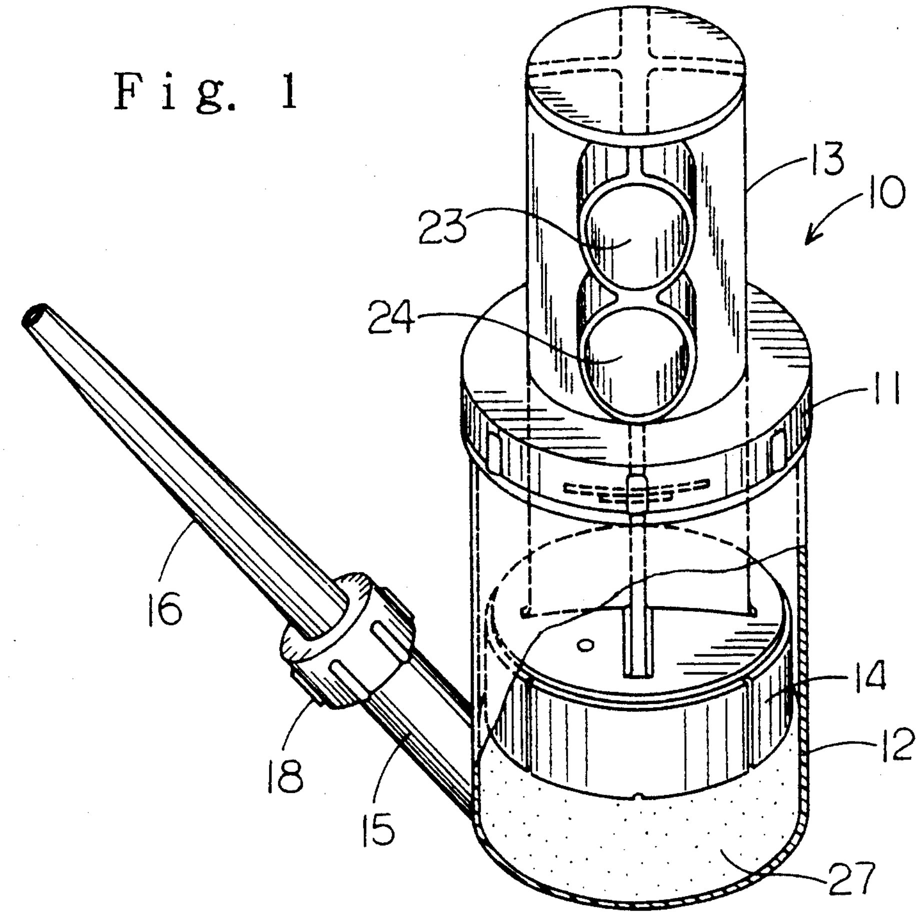
FIG. 1 is a partially cutaway perspective view of a liquid food pot in accordance with a embodiment of the present invention.

Referring now to FIG. 1, the liquid food pot 10 in accordance with one embodiment of the present invention comprises a pot main body 12 with a lid 11, a piston 14 with a pushing down member 13 disposed in the pot main body 12, and a spout 16 mounted on a spout mounting part 15 located at the lower part of the side face or sidewall of pot main body 12; the details will be explained hereinbelow.

Figure 2:
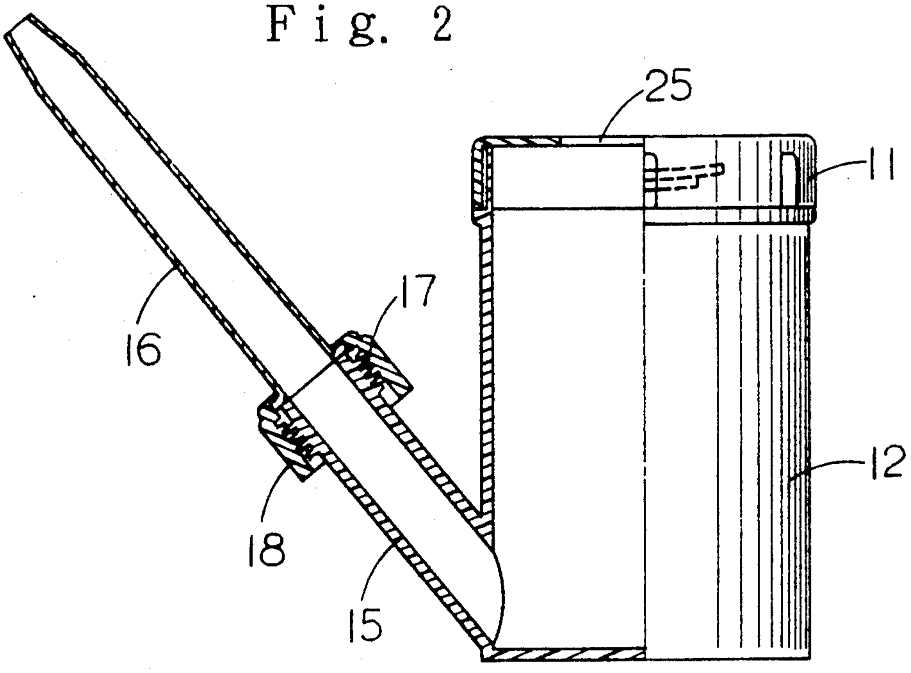
FIG. 2 is a partially sectional view of the main body of the liquid food pot.
Figure 3:
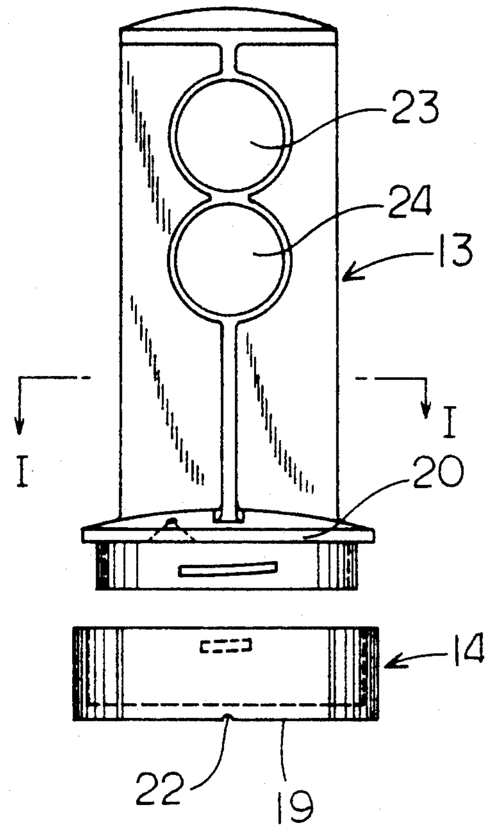
FIG. 3 is a front view illustrating an exploded piston of the liquid food pot.
Figure 4:
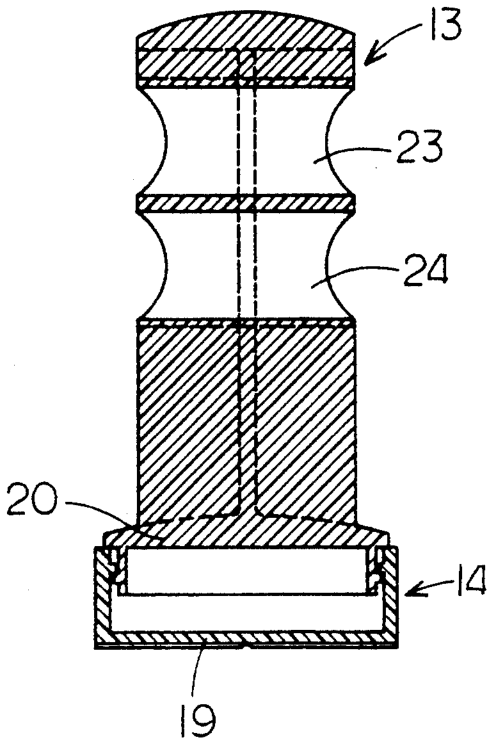
FIG. 4 is a side sectional view of the of the piston.
Figure 5:
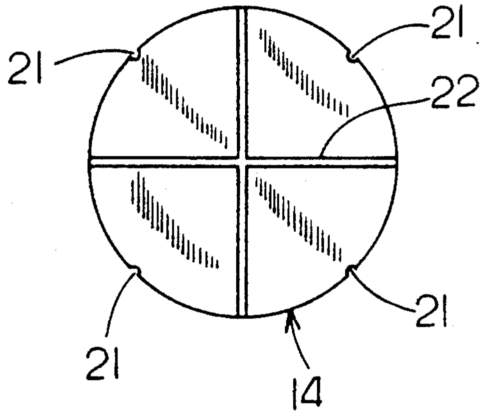
FIG. 5 is a bottom view of the piston.

The mentioned pot main body 12 is made of a transparent synthetic resin (polycarbonate resin, for example) so as to see through the inside thereof, and configuration of the pot main body 12 is cylindrical having a bottom part and circular in section. As is shown in FIG. 2, a spout mounting part 15 is formed on the lower part of the side face. The end periphery of the spout mounting part 15 is formed into a male screw 17.

A spout 16 having an open spout end and a connecting portion made of either a flexible material such as silicon rubber (or other natural rubber or artificial rubber) or an flexible synthetic resin is mounted on the mentioned spout mounting part 15 with a cap 18 which is screwed to the mentioned male screw 17 so that the spout may freely be mounted or removed.

Figure 6:
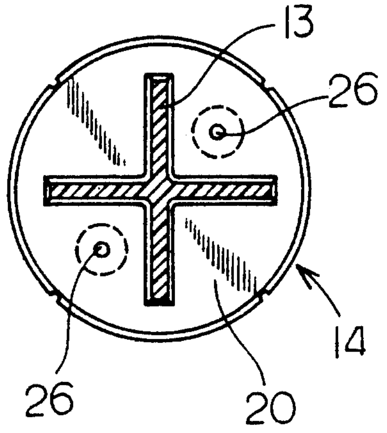
FIG. 6 is a sectional view taken along the line I—I in FIG. 3.
Figure 7:
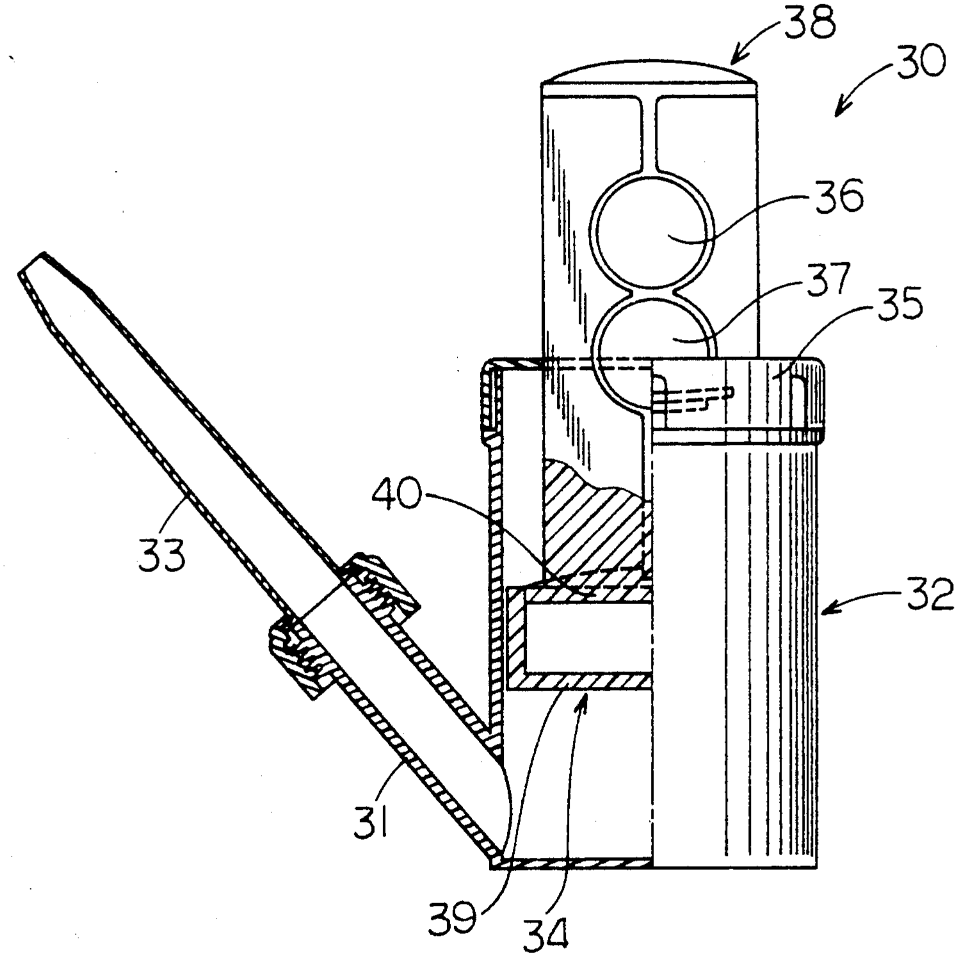
Fig. 7 PRIOR ART
FIG. 7 is a perspective view of a liquid food pot relating to the conventional art.

As shown in FIGS. 3 to 6, the piston 14 also made of a synthetic resin is disposed in the mentioned pot main body 12 so as to be vertically movable. A small gap is secured between the piston 14 and the inside of the pot main body 12. The piston 14 comprises a cylindrical piston main body 19 having a bottom, and a piston lid or ceiling member 20 to be engagedly screwed with the mentioned piston main body 19 by detachable attaching means. The piston lid comprises a disc-shaped main body portion and a substantially cylindrical wall portion. The cylindrical wall portion has a threaded portion on its outer side. As illustrated in FIG. 6, the pushing down member 13 cross-shaped in section is solidly connected to the ceiling member 20. The handle or pushing down member comprises a plurality of radially arranged walls extending transversely from the center of said piston lid, and includes a plurality of openings therethrough.

Air vent comprising four grooves 21 is formed on the side part of the piston main body 19, and a further air vent comprising intersecting grooves 22 is also formed on the bottom side. It may be also preferable that, instead of the mentioned four grooves 21, a satin treatment is applied onto the side of the mentioned piston main body 19 so that microscopic irregularities may be formed to serve as air vents.

Holes 23, 24 are provided on the middle part of the mentioned pushing down member 13 so that the fingers may be inserted thereinto.

The lid 11 provided with a guide hole 25 (in which the pushing down member 13 is inserted so as to be vertically movable) engages with the upper part of the mentioned pot main body 12 to prevent the internal part of the pot main body 12 from entrance of dust and the like while supporting the pushing down member 13 laterally.

The mentioned piston main body 19 is provided with an air vent comprising four grooves 21 at its side surface and a further air vent comprising a cross-shaped groove 22 on the bottom face or surface.

In addition, the mentioned ceiling member 20 is provided with two air vent holes 26 so that the air in the piston 14 may move freely.

Accordingly, to use the liquid food pot 10 as described above, after removing the lid 11 and the piston 14 from the pot main body 12, a predetermined liquid food 27 is inserted therein, then the piston 14 is inserted and the lid 11 is applied to the pot main body 12 as illustrated in FIG. 1.

Thereafter, if the piston 14 is located on the upper part of the pot main body 12, the piston 14 is caused to move downward by inserting a finger into the lower hole 24 while holding the pot main body 12 from outside with the remaining fingers.

In this operation, if there remains an air in the space below the piston 14, the air is forced out through the grooves 21 formed on the periphery of the piston. Thus, the liquid food 27 is directly pushed forward by means of the piston 14 and moves gradually toward the spout 16.

If the piston 14 is located on the lower part of the pot main body 12, either the upper hole 23 or the upper end of the pushing down member is pushed down by finger.

At this time the top end of mentioned spout 16 is inserted in the mouth of patient or sick person, and the joint portion of the spout 16 is pressed by fingers, whereby a mouthful of liquid food 27 located on the top end portion of the spout 16 is delivered to their mouth.

After using the liquid food pot 10, this liquid food pot 10 is disassembled to be washed easily even though the residual liquid food 27 remains in the grooves 21, 22 or inner part of the piston 14 since the liquid food pot 10 can be disassembled.

Further, the piston 14 does not deform even if the mentioned liquid food pot 10 is disinfected by boiling or steam because the piston 14 is hollow and provided with air vent holes 26 to allow the air inside the piston to go out or come in therethrough freely.

Moreover, since the pot main body 12 is made of transparent synthetic resin, it is possible to see from outside the liquid food placed inside the pot.

In addition, though it is preferable that the configuration of the pot main body is circular in section in view of easy manufacture, the present invention is applicable also to other configuration such as ellipse, ovalness, square.

What is claimed is:

1. A liquid foot pot, comprising:
   - a cylindrical pot main body having a side face and a bottom, said cylindrical pot main body having a spout mounting part on a lower part of said side face;
   - a spout of flexible material mounted on said spout mounting part;
   - a piston made of synthetic resin material slidably movable within said cylindrical pot main body, said piston including a piston body having a piston sidewall which has an air vent along its outer periphery, a bottom plate which is fixed to a bottom end of said piston sidewall, and a ceiling member having at least one air vent therein, said ceiling member being threadedly engaged with an upper portion of said piston sidewall;
   - a lid covering said cylindrical pot main body having a passage therethrough; and
   - a synthetic resin handle member connected to said piston and provided through said passage in said lid, said handle member having at least one hole therein into which at least one finger can be inserted, wherein said handle member being fixed to said ceiling member of said piston.

2. A food pot for dispensing liquid foods, comprising:

a main body portion having a bottom and an upstanding sidewall, and including a spout mounting portion formed on a lower portion of said sidewall;

a spout mounted on said spout mounting portion, said spout being resiliently deformable and having an open spout end opposite a connecting portion which is connected to said spout mounting portion, said open spout end being in communication with the interior of said main body portion;

a piston snugly and slidably received within said sidewall of said main body portion, said piston being substantially hollow and including a lower piston body portion and a lid portion, said lower piston body portion having a lower piston face and an upstanding piston sidewall, said upstanding piston sidewall having adjacent an uppermost end thereof detachable attaching means for removably attaching said lid portion to said lower piston body portion;

a handle extending from said piston lid;

a pot lid closing said pot main body portion so as to enclose said piston between said bottom pot wall and said pot lid, said pot lid having an opening therein slidably receiving said handle;

said piston lid having an opening therethrough in communication with the interior of said piston;

said piston sidewall having a plurality of grooves which extend along the entire length of said piston lower portion sidewall; and at least one groove extending completely across said lower piston face.

3. A food pot as claimed in claim 2, wherein said pot main body portion is composed of a transparent material.

4. A food pot as claimed in claim 2, wherein said piston lower portion and said piston lid are composed of a synthetic resin material.

5. A food pot as claimed in claim 2, wherein said handle extending from said piston lid includes at least one opening therethrough adapted to receive a finger.

6. A food pot as claimed in claim 2, wherein said handle comprises a plurality of radially arranged walls extending transversely from the center of said piston lid, and includes a plurality of openings therethrough.

7. A food pot as claimed in claim 2, wherein said piston lid comprises a disc-shaped main body portion and a substantially cylindrical wall portion extending from said main body portion, said cylindrical wall portion having a threaded portion on its outer side.

* * * * *